US009826365B2

(12) United States Patent
Ko et al.

(10) Patent No.: US 9,826,365 B2
(45) Date of Patent: Nov. 21, 2017

(54) METHOD FOR DECIDING LOCATION OF TARGET DEVICE AND ELECTRONIC DEVICE THEREOF

(71) Applicant: Samsung Electronics Co., Ltd., Suwon-si, Gyeonggi-do (KR)

(72) Inventors: Chang-Gun Ko, Suwon-si (KR); Hun Lim, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 14/908,058

(22) PCT Filed: Jul. 29, 2014

(86) PCT No.: PCT/KR2014/006935

§ 371 (c)(1),
(2) Date: Jan. 27, 2016

(87) PCT Pub. No.: WO2015/016579

PCT Pub. Date: Feb. 5, 2015

(65) Prior Publication Data

US 2016/0174043 A1 Jun. 16, 2016

(30) Foreign Application Priority Data

Jul. 30, 2013 (KR) ........................ 10-2013-0089995

(51) Int. Cl.
*H04W 24/00* (2009.01)
*H04W 4/02* (2009.01)
(Continued)

(52) U.S. Cl.
CPC ............... *H04W 4/026* (2013.01); *G01S 5/16* (2013.01); *G06K 9/00671* (2013.01);
(Continued)

(58) Field of Classification Search
CPC ... H04W 64/00; H04L 29/08657; G01C 21/36
(Continued)

(56) References Cited

U.S. PATENT DOCUMENTS 6,801,507 B1 10/2004 Humpleman et al.
2007/0123308 A1 5/2007 Kim et al.
(Continued)

FOREIGN PATENT DOCUMENTS

EP 1790993 A2 5/2007
EP 2343882 A2 7/2011
(Continued)

*Primary Examiner* — Danh Le
(74) *Attorney, Agent, or Firm* — Jefferson IP Law, LLP

(57) ABSTRACT

A method for determining a location of a target device and an electronic device thereof are provided. The method includes acquiring an image photographing a first electronic device, determining a distance between the second electronic device and the first electronic device based on the acquired image, determining a direction in which the second electronic device photographs the first electronic device, determining a location of any one of the first electronic device and the second electronic device based on the decided distance and direction, and registering the determined location.

15 Claims, 17 Drawing Sheets

START
ACQUIRE IMAGE PHOTOGRAPHING 1ST ELECTRONIC DEVICE ~401
DECIDE DISTANCE BETWEEN 2ND ELECTRONIC DEVICE AND 1ST ELECTRONIC DEVICE ON BASIS OF ACQUIRED IMAGE ~403
DECIDE DIRECTION IN WHICH 2ND ELECTRONIC DEVICE PHOTOGRAPHS 1ST ELECTRONIC DEVICE ~405
DECIDE LOCATION OF ANY ONE OF 1ST ELECTRONIC DEVICE AND 2ND ELECTRONIC DEVICE ON BASIS OF DECIDED DISTANCE AND DIRECTION ~407
REGISTER DECIDED LOCATION ~409
END

(51) Int. Cl.
*G01S 5/16* (2006.01)
*H04L 29/08* (2006.01)
*G06K 9/00* (2006.01)
*H04L 12/28* (2006.01)

(52) U.S. Cl.
CPC ............ *H04L 67/125* (2013.01); *H04L 67/34* (2013.01); *H04W 4/023* (2013.01); *H04L 12/2803* (2013.01); *H04L 12/2809* (2013.01)

(58) Field of Classification Search
USPC .................... 455/457, 456.6, 456.1; 348/113
See application file for complete search history.

(56) References Cited

U.S. PATENT DOCUMENTS

2008/0297608 A1 12/2008 Border et al.
2012/0088526 A1* 4/2012 Lindner ............ H04M 1/72522 455/457
2012/0297019 A1* 11/2012 Ting ........................ G06F 3/038 709/217
2012/0328101 A1* 12/2012 Lakshminarayanan H04L 63/0823 380/258
2013/0157697 A1* 6/2013 Kang ...................... H04W 4/02 455/457
2013/0187953 A1 7/2013 Matsumura et al.
2014/0362255 A1* 12/2014 Kuang ............... H04N 5/23293 348/231.5
2015/0045059 A1* 2/2015 Rudow ................... H04W 4/04 455/456.1
2015/0233724 A1* 8/2015 Lee ........................ G01C 21/36 348/113
2016/0109940 A1* 4/2016 Lyren ..................... G06F 3/011 463/2

FOREIGN PATENT DOCUMENTS

KR 10-2005-0115647 A 12/2005
KR 10-0679864 B1 2/2007
KR 10-2010-0041926 A 4/2010

* cited by examiner

[Fig. 1]
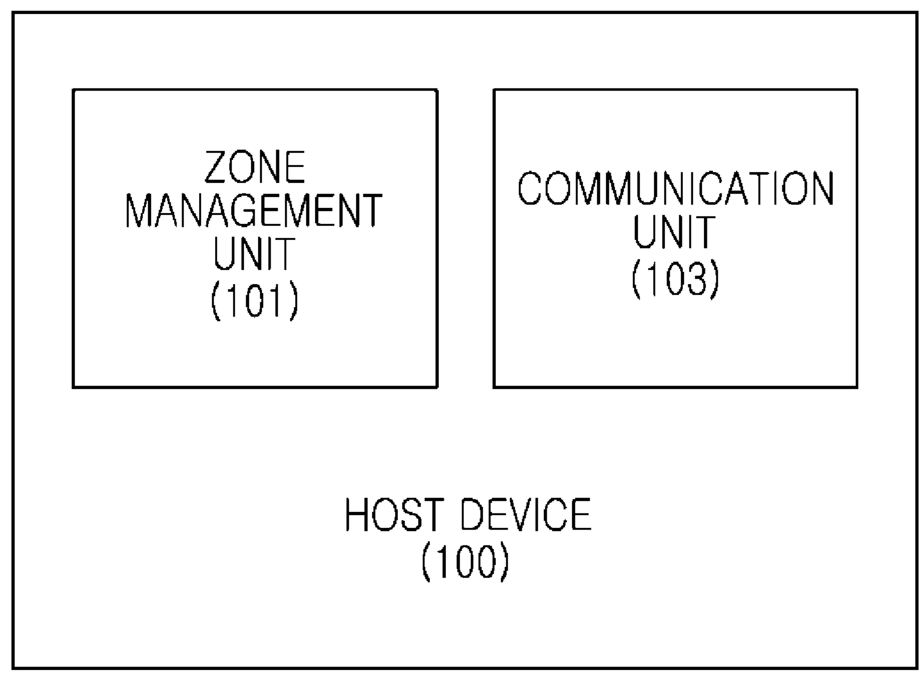

[Fig. 2]
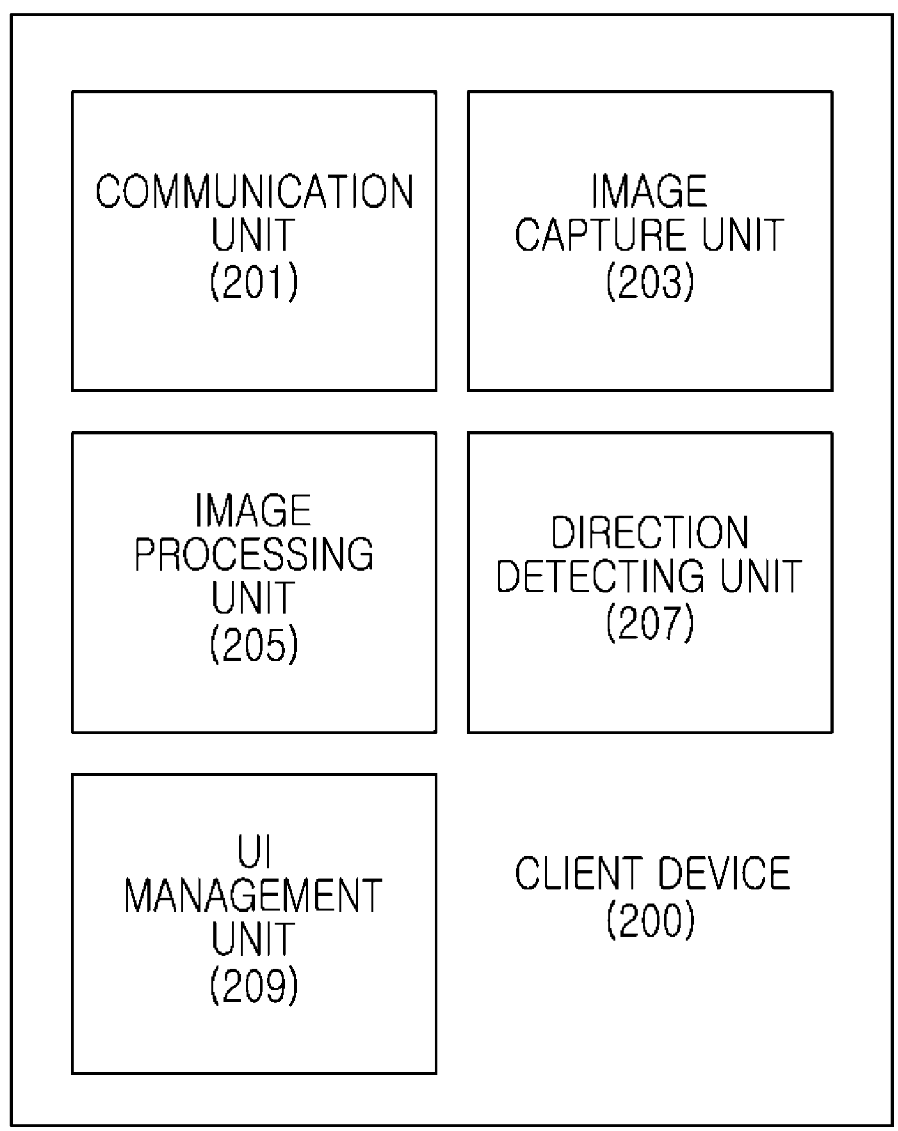

[Fig. 3]
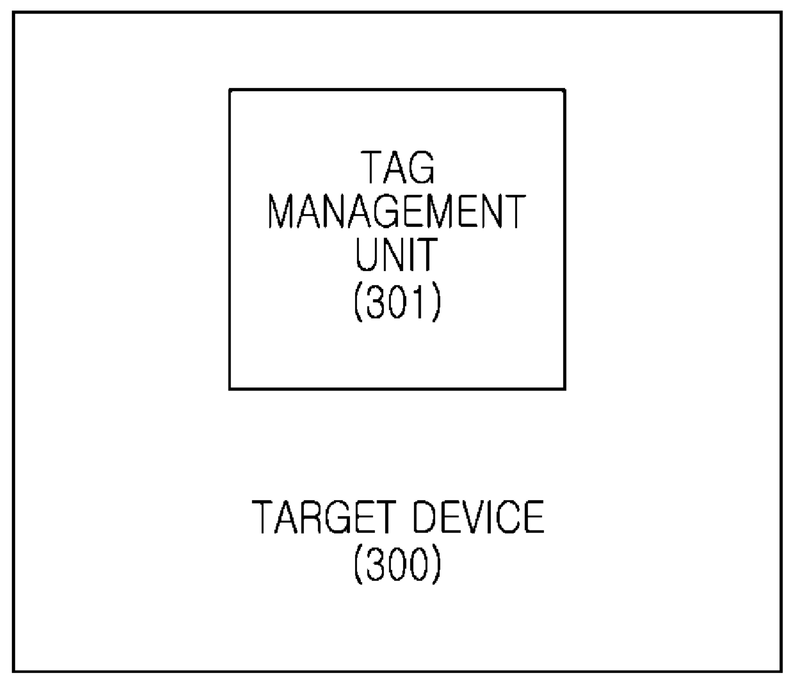

[Fig. 4a]
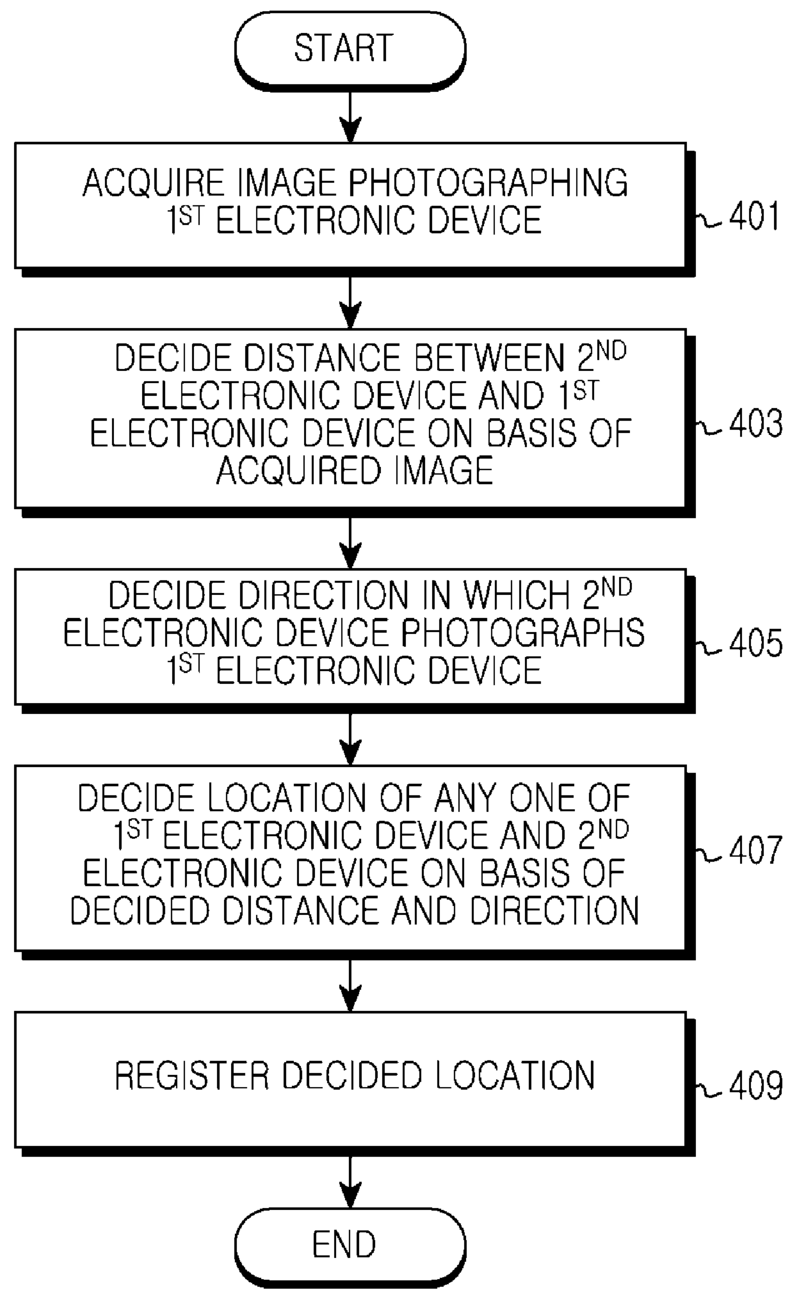

[Fig. 4b]
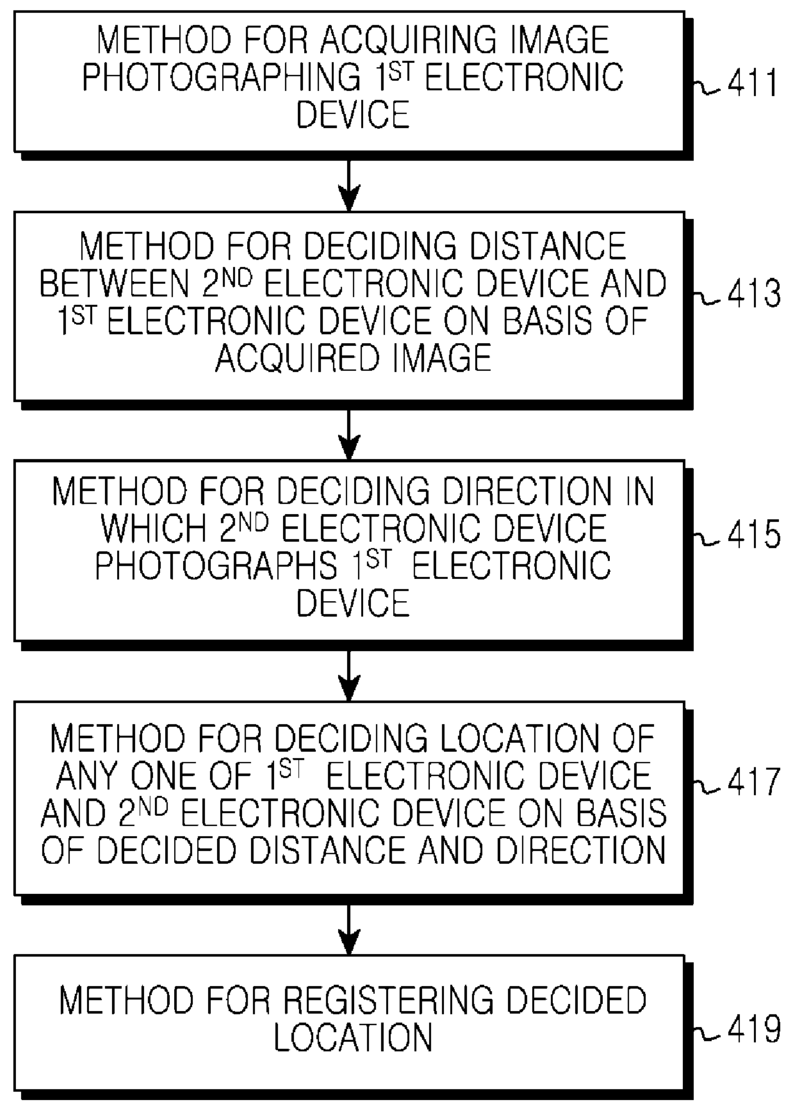

[Fig. 5]
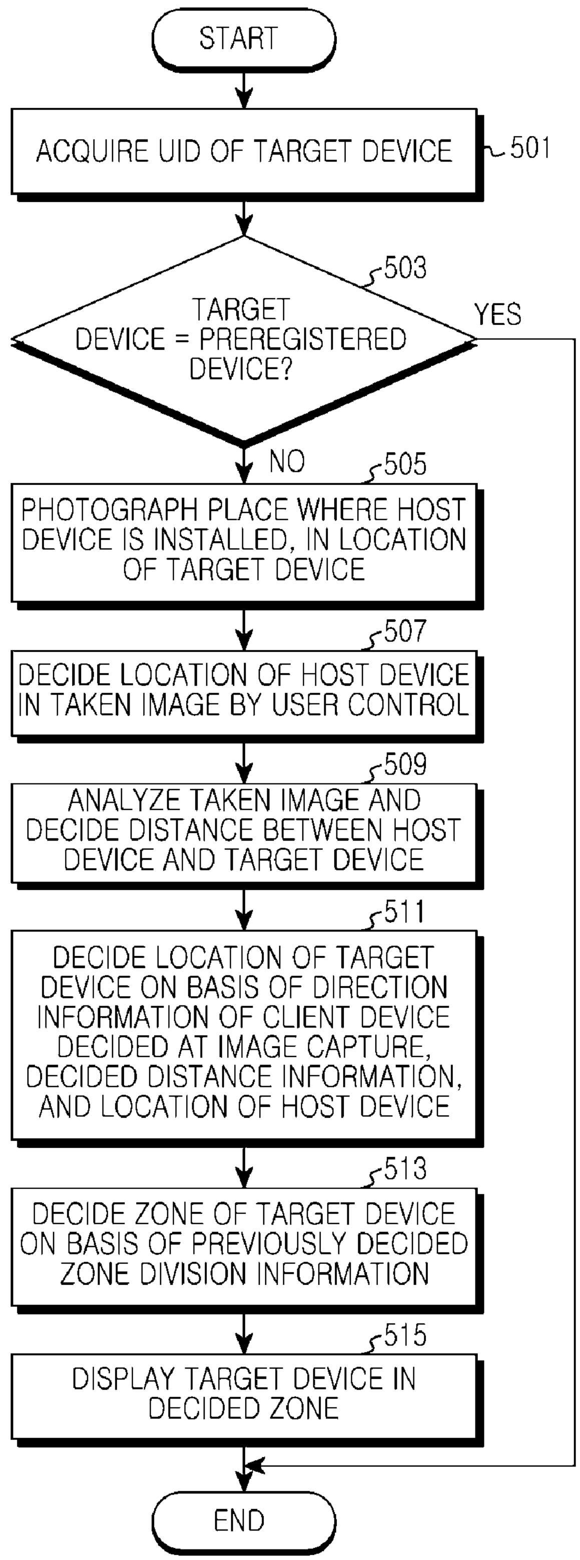

[Fig. 6]
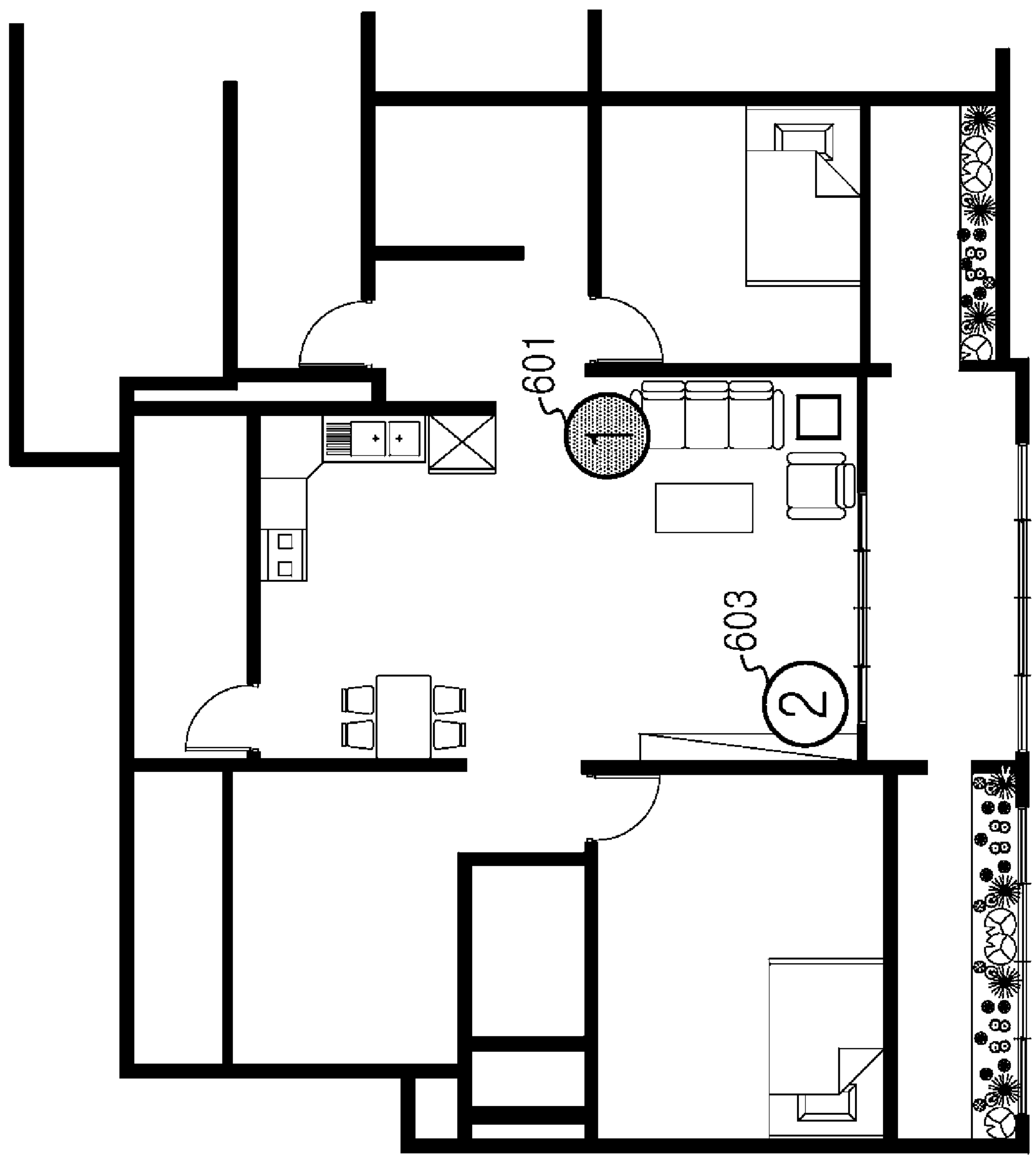

[Fig. 7]
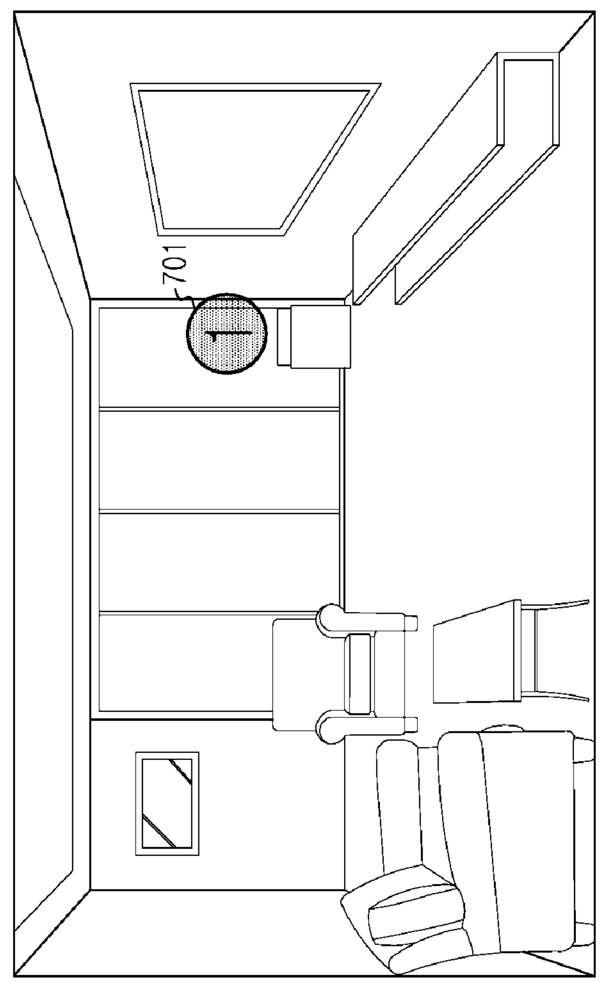

[Fig. 8]
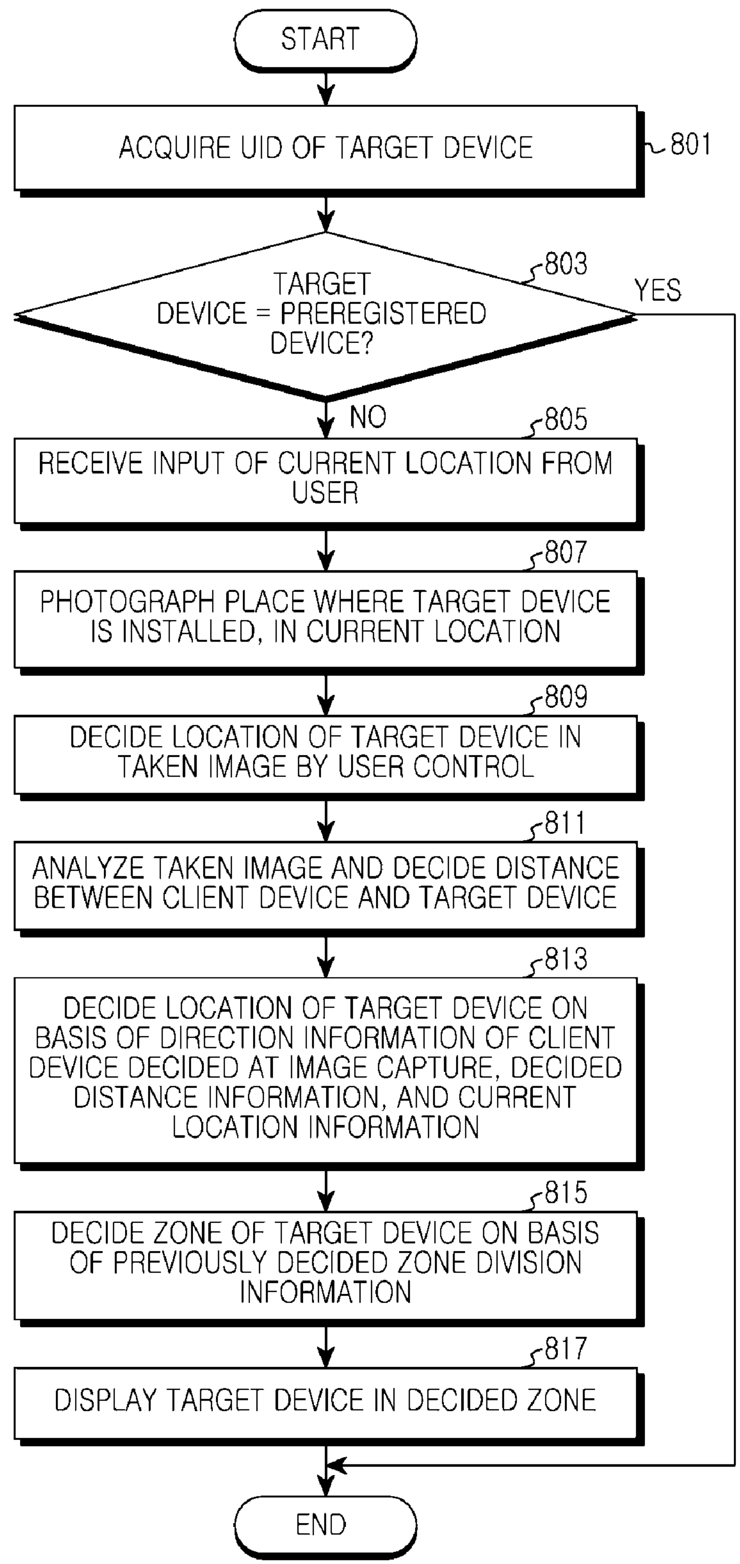

[Fig. 9]
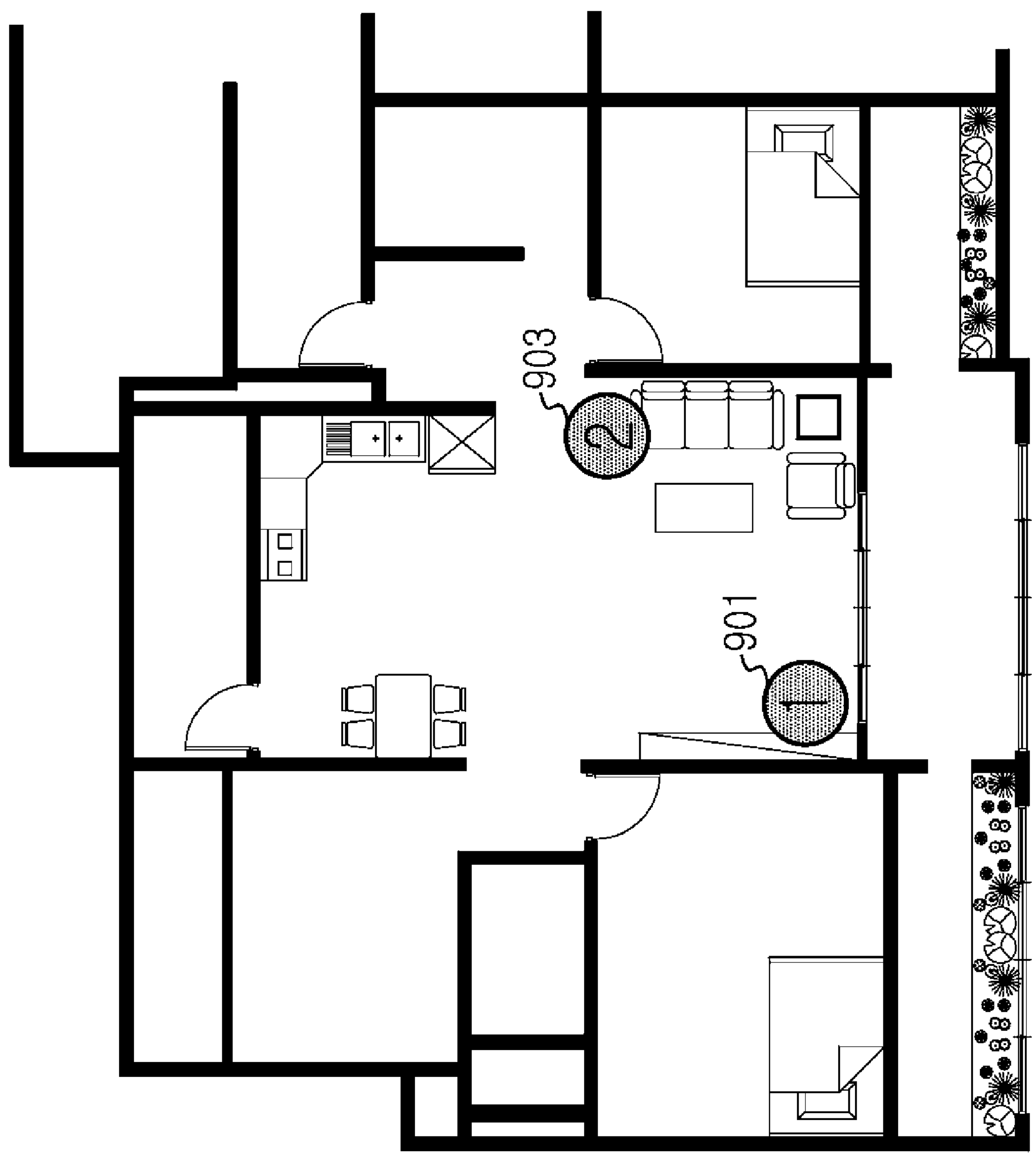

[Fig. 10]
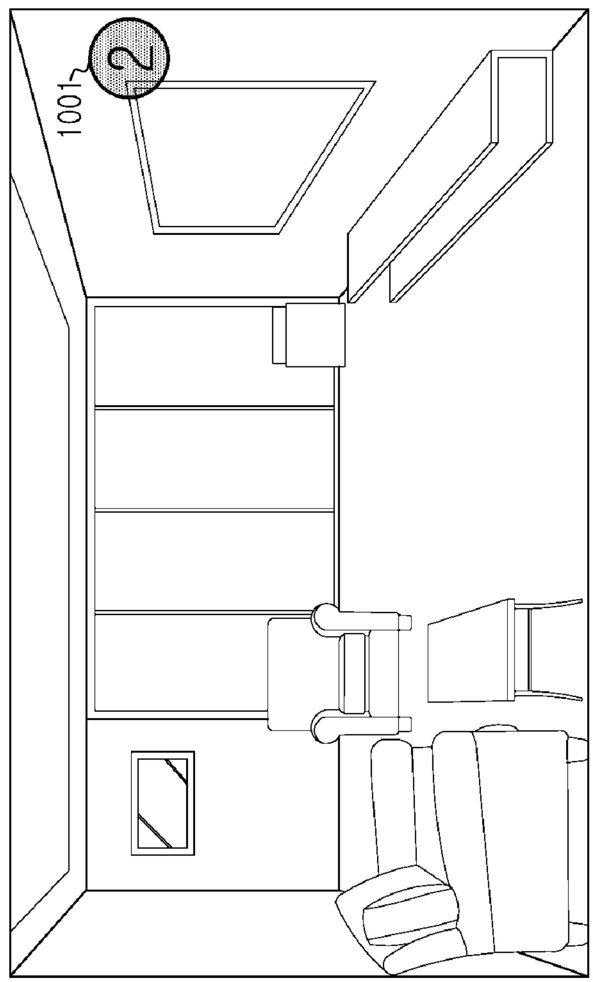

[Fig. 11a]
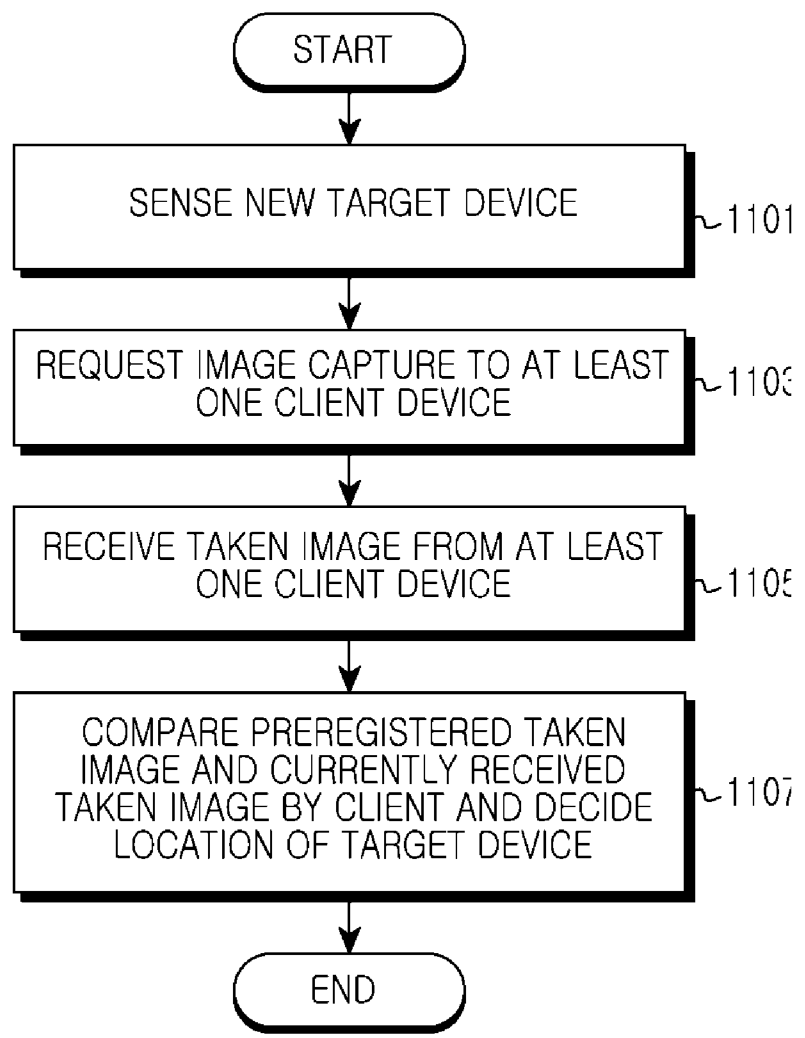

[Fig. 11b]
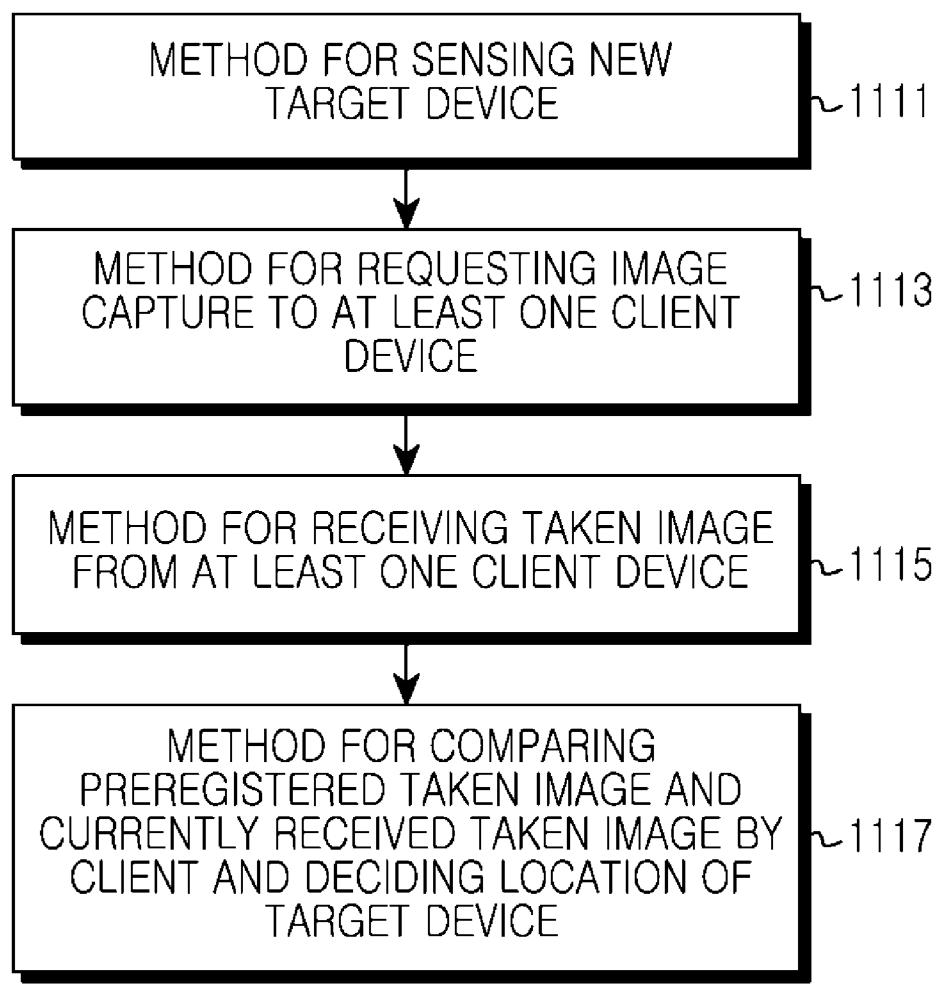

[Fig. 12]
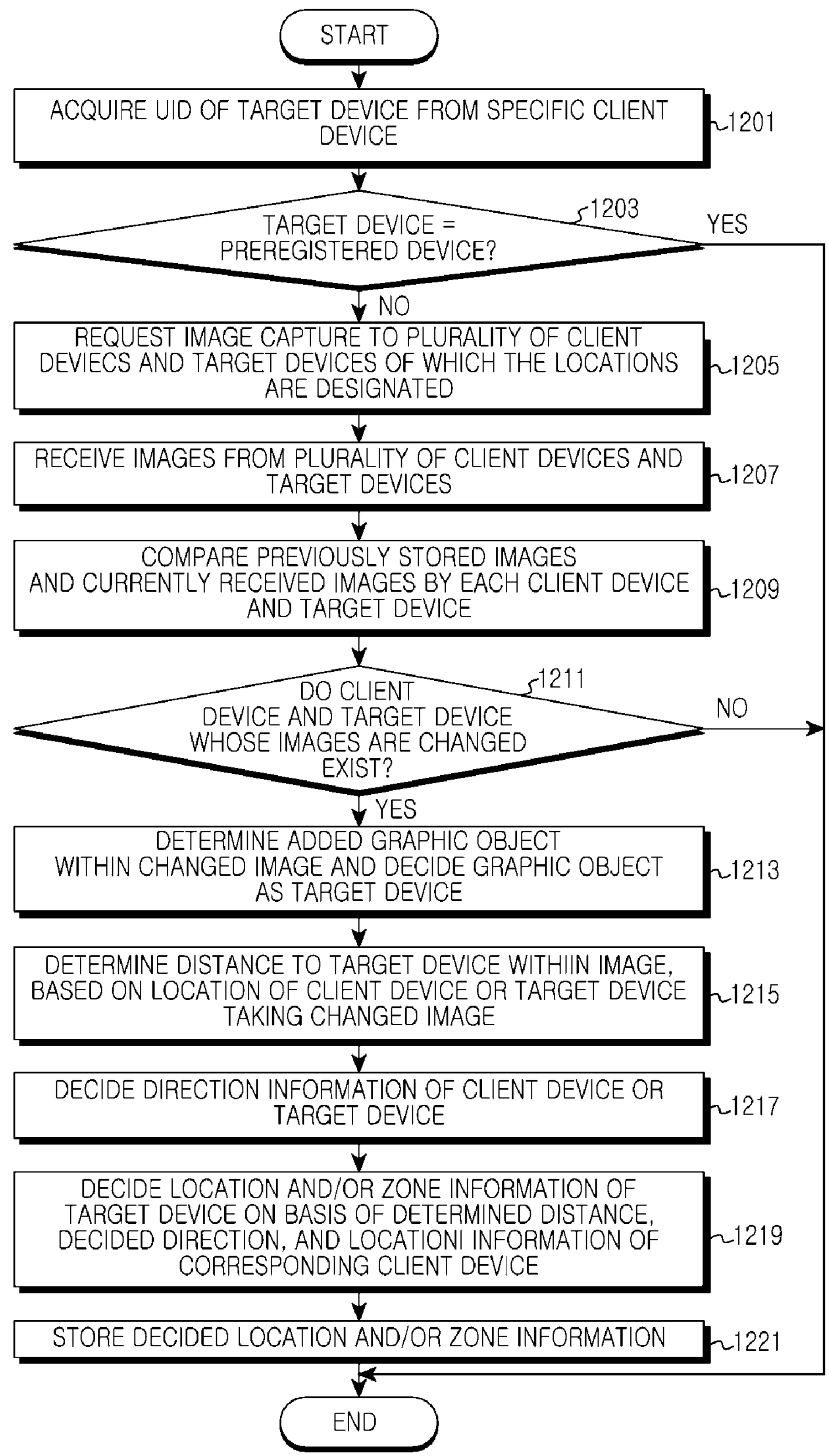

[Fig. 13]
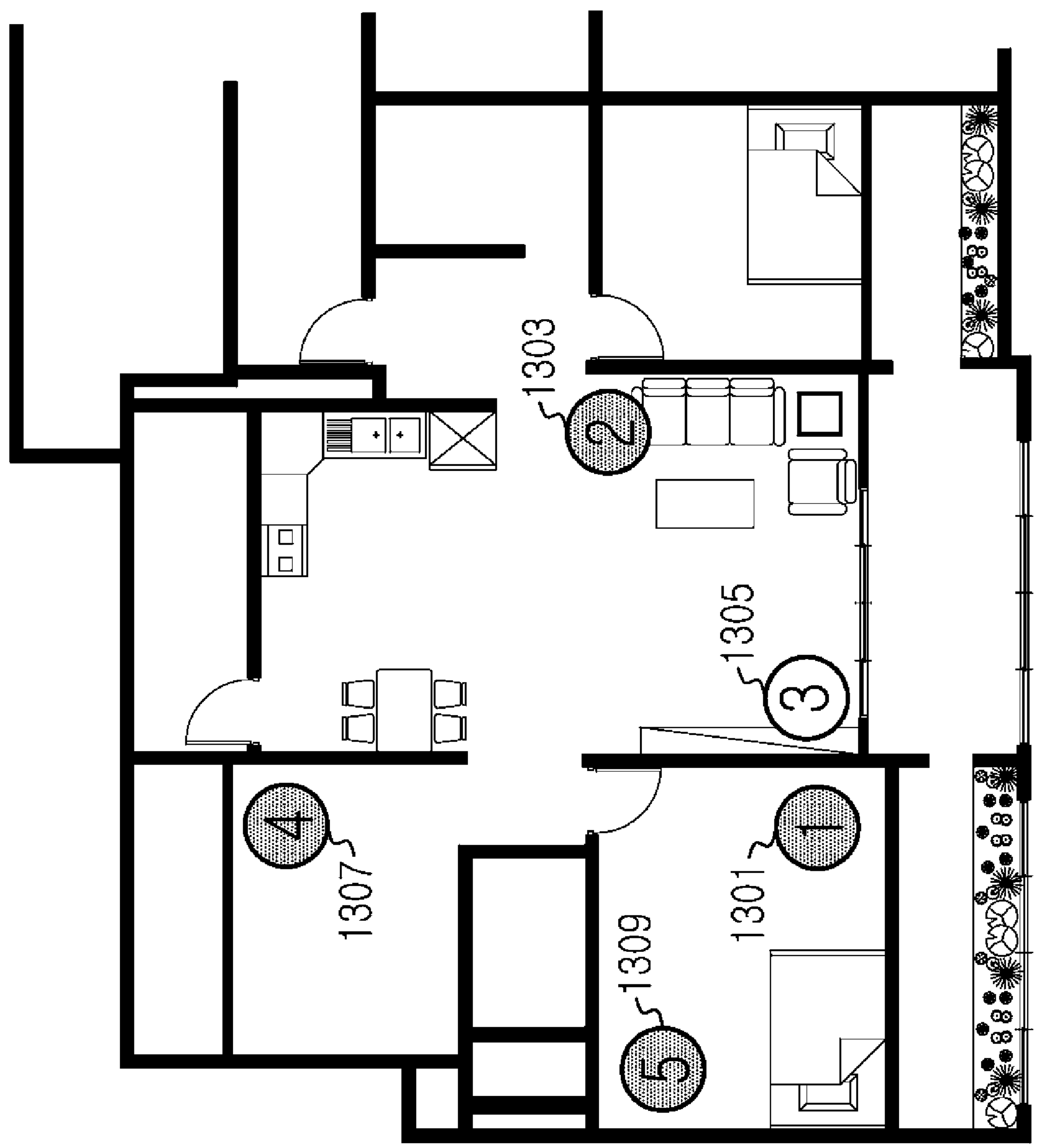

[Fig. 14]
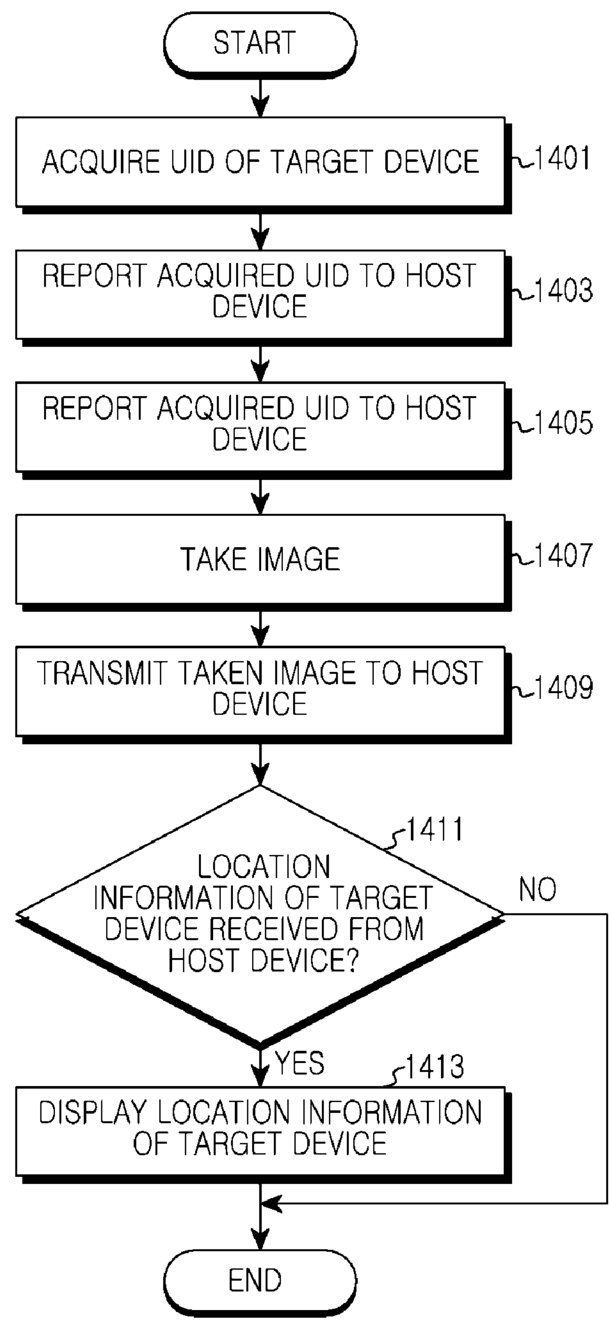

[Fig. 15]
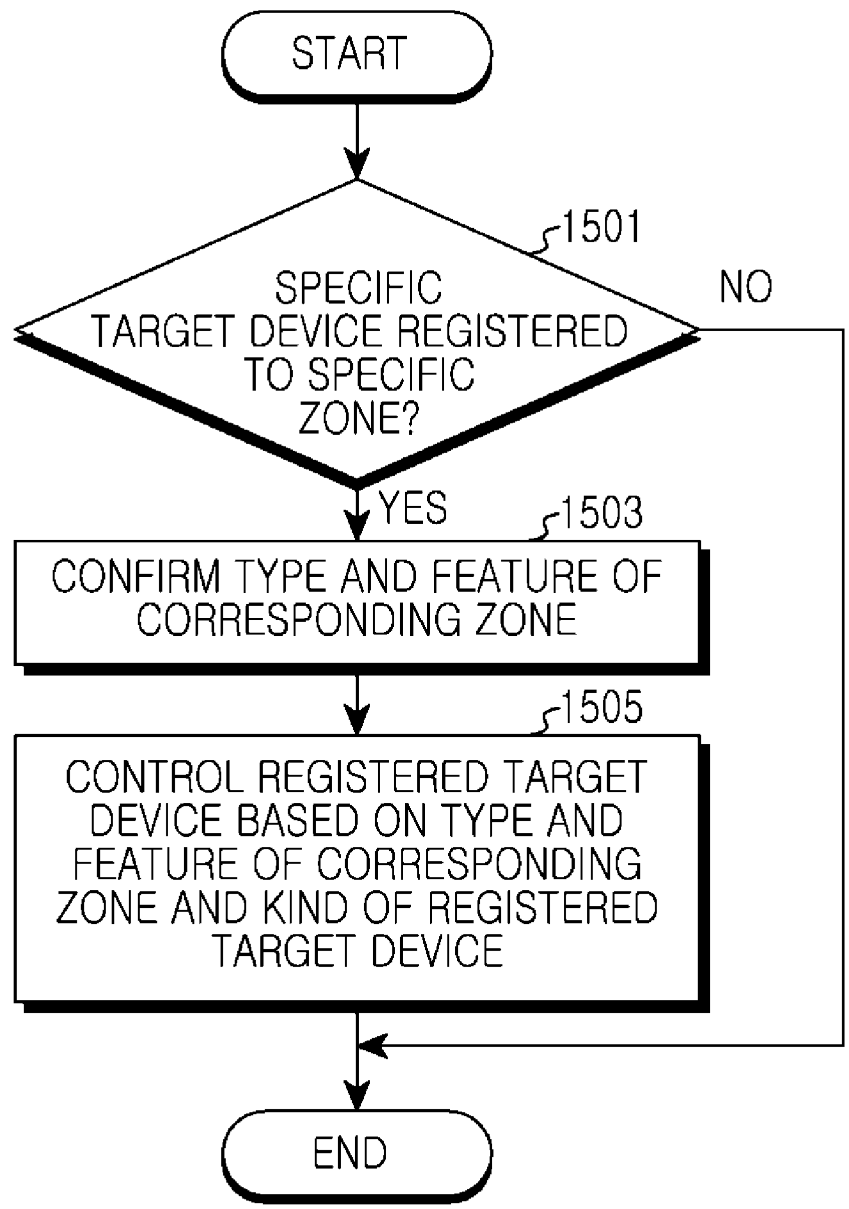

METHOD FOR DECIDING LOCATION OF TARGET DEVICE AND ELECTRONIC DEVICE THEREOF

TECHNICAL FIELD

The present disclosure relates to an electronic device. More particularly, the present disclosure relates to a method for deciding a location of a target device in an electronic device.

BACKGROUND ART

Generally, as a method for locating an electronic device in a zone-based service, a method using a strength of a received signal and a method using a tag are provided. For example, a host device measures a Received Signal Strength Indication (RSSI) of an electronic device, and determines a distance between the host device and the electronic device intending to search based on the measured RSSI, thereby being capable of deciding a location of the electronic device. For another example, the host device can decide the location of the electronic device based on received tag information, using infrared sensors or Radio-Frequency IDentification (RFID) tags installed in a service space.

If the host device decides the location of the electronic device based on the measured RSSI, the distance between the host device and the electronic device is determinable, but there is a disadvantage that the host device cannot be aware of a direction in which the electronic device is located. In addition, there is an error caused by a medium between the host device and the electronic device. Further, if the host device decides the location of the electronic device using the infrared sensor or the RFID sensor, there is a disadvantage that the infrared sensors should be attached in at least three directions or RFID readers capable of reading the RFID tags should be provided in the at least three directions.

Accordingly, there is a need to provide a method capable of minimizing an error and deciding a location of an electronic device in a host device not equipped with a separate device.

The above information is presented as background information only to assist with an understanding of the present disclosure. No determination has been made, and no assertion is made, as to whether any of the above might be applicable as prior art with regard to the present disclosure.

DISCLOSURE OF INVENTION

Solution to Problem

Aspects of the present disclosure are to address at least the above-mentioned problems and/or disadvantages and to provide at least the advantages described below. Accordingly, an aspect of the present disclosure is to provide a method and an apparatus for deciding a location of a target device in an electronic device.

Another aspect of the present disclosure is to provide a method and an apparatus for deciding a location of a target device, using an image photographing the target device, in an electronic device.

A further aspect of the present disclosure is to provide a method and an apparatus for controlling a target device of which the location is decided in an electronic device.

Yet another aspect of the present disclosure is to provide a method and an apparatus for photographing a place where a host device is installed and deciding a location of a target device in an electronic device.

Still another aspect of the present disclosure is to provide a method and an apparatus for receiving an input of a current location from a user and deciding a location of a target device in an electronic device.

Still another aspect of the present disclosure is to provide a method and an apparatus for deciding a location of a target device based on images captured from a plurality of client devices of which the locations are designated in an electronic device.

In accordance with an aspect of the present disclosure, a method of determining a location of at least one electronic device in a second electronic device is provided. The method includes acquiring an image comprising a first electronic device, determining a distance between the first electronic device and the second electronic device based on the acquired image, determining a direction of the second electronic device, determining a location of any one of the first electronic device and the second electronic device based on the determined distance and direction, and storing the determined location.

In accordance with another aspect of the present disclosure, a second electronic device for determining a location of at least one electronic device is provided. The device includes a location determination module configured to, after acquiring an image comprising a first electronic device, determine a distance between the first electronic device and the second electronic device based on the acquired image, determine a direction of the second electronic device, and determine a location of any one of the first electronic device and the second electronic device based on the determined distance and direction, and a storage unit configured to store the determined location.

In accordance with another aspect of the present disclosure, a method of determining a location of a target device in a host device is provided. The method includes detecting the target device, requesting an image capture to at least one client device, receiving a captured image from the at least one client device, and comparing a stored captured image and the currently received captured image from the at least one client device and determining a location of the target device.

In accordance with another aspect of the present disclosure, a host device for determining a location of a target device is provided. The device includes a location determination module configured to detect the target device, to request an image capture to at least one client device, to receive a captured image from the at least one client device, and to compare a stored captured image and the currently received captured image from the at least one client device and to determine a location of the target device.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF DRAWINGS

The above and other aspects, features, and advantages of certain embodiments of the present disclosure will be more apparent from the following description taken in conjunction with the accompanying drawings, in which:

FIG. 1 is a block diagram illustrating a construction of a host device for deciding a location of an electronic device in a zone-based service according to an embodiment of the present disclosure;

FIG. 2 is a block diagram illustrating a construction of a client device for deciding a location of an electronic device in a zone-based service according to an embodiment of the present disclosure;

FIG. 3 is a block diagram illustrating a construction of a target device intending to decide a location in a zone-based service according to an embodiment of the present disclosure;

FIG. 4A is a flowchart illustrating a procedure of deciding a location of a target device based on an image photographing the target device in an electronic device to an embodiment of the present disclosure;

FIG. 4B is a diagram illustrating a method for deciding a location of a target device based on an image photographing the target device in an electronic device according to an embodiment of the present disclosure;

FIG. 5 is a flowchart illustrating a procedure of photographing a place where a host device is installed and deciding a location of a target device in a client device according to an embodiment of the present disclosure;

FIG. 6 is a diagram illustrating locations of a host device and a target device installed indoors according to an embodiment of the present disclosure;

FIG. 7 is a diagram illustrating an image photographing a place where a host device is installed in a location of a target device in an electronic device according to an embodiment of the present disclosure;

FIG. 8 is a flowchart illustrating a procedure of, when there is no device of which the location is known, deciding a location of a target device in a client device according to an embodiment of the present disclosure;

FIG. 9 is a diagram illustrating locations of a host device and a target device installed indoors according to an embodiment of the present disclosure;

FIG. 10 is a diagram illustrating an image photographing in a current location a place where a target device is installed in a client device according to an embodiment of the present disclosure;

FIG. 11A is a flowchart illustrating a procedure of deciding a location of a new target device when the new target device is detected in an electronic device according to an embodiment of the present disclosure;

FIG. 11B is a diagram illustrating a method for deciding a location of a new target device when the new target device is detected in an electronic device according to an embodiment of the present disclosure;

FIG. 12 is a flowchart illustrating a procedure of deciding a location of a target device in accordance to an image change or non-change in a host device according to an embodiment of the present disclosure;

FIG. 13 is a diagram illustrating a location of a target device installed indoors according to an embodiment of the present disclosure;

FIG. 14 is a flowchart illustrating a procedure of displaying location information of an added target device in a client device or target device whose location is designated according to an embodiment of the present disclosure; and FIG. 15 is a flowchart illustrating a procedure of controlling an application corresponding to a target device newly registered to a specific zone in a host device according to an embodiment of the present disclosure.

Throughout the drawings, it should be noted that like reference numbers are used to depict the same or similar elements, features, and structures.

BEST MODE FOR CARRYING OUT THE INVENTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to skill in the art, may occur in amounts that do not preclude the effect the characteristic was intended to provide.

The following description has been made for an example of deciding a location of a target device indoors for description convenience's sake, but the present disclosure is not limited to this, and can be applied in a place comprised of a plurality of zones.

FIG. 1 is a block diagram illustrating a construction of a host device for deciding a location of an electronic device in a zone-based service according to an embodiment of the present disclosure.

Referring to FIG. 1, the host device 100 includes a zone management unit 101 and a communication unit 103. Here, the host device 100 can be a set top box installed in a designated location.

The zone management unit 101 can store and manage indoor construction information comprised of a plurality of zones. For example, the zone management unit 101 can store and manage construction information comprised of a first zone (e.g., a big room), a second zone (e.g., a small room), a third zone (e.g., a living room), and a fourth zone (e.g., a kitchen). At this time, each zone can be previously set or stored in a development step or can be set and stored by user control, and may be changed by user control.

Further, the zone management unit 101 can control an application corresponding to a registered target device, in accordance to the type and feature of a zone where the registered target device is located and the kind of the registered target device. In other words, though it is the same target device, the zone management unit 101 can install different applications in accordance to the type and feature of a zone where the target device is located. Further, the zone management unit 101 can control a menu of an application installed in the target device in accordance to user control or uninstall the application. For example, the zone management unit 101 can confirm that the first zone is the living room, and install a weather forecast application expected to be often used in the living room, in a refrigerator being the target device. For another example, the zone management unit 101 can confirm that the second zone is the kitchen, and install a recipe application expected to be often used in the kitchen, in the refrigerator being the target device.

Further, if the zone management unit 101 includes a device capable of detecting a Unique IDentification (UID), the zone management unit 101 can detect UIDs of devices located within a constant distance every set period or in accordance to user control, and can determine if a corresponding device is a device registered to the host device 100 in accordance to whether a corresponding UID is the same as a previously stored UID. If the corresponding device is not the registered device, the zone management unit 101 can detect that a target device needing location registration exists, and recognize the corresponding UID as a UID of the target device. At this time, the zone management unit 101 can detect the UIDs of the devices using tag information, such as a Radio-Frequency IDentification (RFID) tag, a Near Field Communication (NFC) tag, a Quick Response (QR) code, a bar code, and the like.

If the zone management unit 101 of the host device 100 has a module for deciding a location of a target device, the zone management unit 101 can decide the location of the target device based on a plurality of information received through the communication unit 103. For example, if an image photographing the host device 100 and direction information of a client device are received from the client device, the zone management unit 101 can determine a distance between the location (i.e., a location photographing the host device 100) of the target device and a location of the host device 100, using the received image, and determine a coordinate of the target device based on the determined distance information between the target device and the host device 100 and the received direction information of the client device, and decide as the location of the target device a location corresponding to the determined coordinate of the target device. At this time, assume that the host device 100 has a module capable of determining a distance between an object existing within the image and an object taking the image. For another example, if distance information between the target device and the host device 100 and direction information of the client device are received from the client device, the zone management unit 101 can determine a coordinate of the target device based on the received distance information and direction information, and decide as the location of the target device a location corresponding to the determined coordinate of the target device. For further example, if determined coordinate information of the target device is received from the client device, the zone management unit 101 can decide as the location of the target device a location corresponding to the received coordinate information of the target device.

At this time, the host device 100 may receive the image photographing the host device 100 in the target device, from the target device.

The communication unit 103 can transmit/receive data with the client device and the target device. The communication unit 103 can include a radio frequency receiver and transceiver and/or an optical (for example, infrared) receiver and transceiver. For example, the communication unit 103 can include a wireless communication system supporting any one of a Global System for Mobile Communication (GSM) network, an Enhanced Data GSM Environment (EDGE) network, a Code Division Multiple Access (CDMA) network, a Wireless-Code Division Multiple Access (W-CDMA) network, a Long Term Evolution (LTE) network, an Orthogonal Frequency Division Multiple Access (OFDMA) network, a Wireless Fidelity (Wi-Fi) network, a Wireless interoperability for Microwave Access (WiMAX) network, or/and a Bluetooth network. The wireless communication system according to an embodiment of the present disclosure is not limited to a wireless communication system supporting the aforementioned networks, and may be a wireless communication system supporting other networks. The communication unit 103 according to the present disclosure can receive an image photographing the host device 100 in a location of the target device and direction information of the client device, from the client device. In addition, the communication unit 103 can receive the image photographing the host device 100 in the target device and direction information of the target device, from the target device.

Further, the communication unit 103 can receive distance information between the target device and the host device 100, and direction information of the client device decided at the time of image capture, from the client device. In addition, the communication unit 103 can receive the distance information between the target device and the host device 100, and direction information of the target device decided at the time of image capture, from the target device.

In addition, the communication unit 130 can receive from the client device coordinate information of the target device determined in the client device. In addition, the communication unit 103 can receive from the target device the coordinate information of the target device determined in the target device.

The aforementioned description has been made for a method of acquiring an image photographing the host device 100 from the client device or target device, analyzing the acquired image, and deciding a location of the target device, but, in a case of the host device 100 with a camera, the host device 100 may photograph the target device, analyze an acquired image, and decide a location of the target device.

FIG. 2 is a block diagram illustrating a construction of a client device for deciding a location of an electronic device in a zone-based service according to an embodiment of the present disclosure.

Referring to FIG. 2, a client device 200 includes a communication unit 201, an image capture unit 203, an image processing unit 205, a direction detecting unit 207, and a User Interface (UI) management unit 209. Here, the client device 200 can be a portable terminal (for example, a smart phone).

The communication unit 201 can transmit/receive data with the host device 100 and the target device. The communication unit 201 can include a radio frequency receiver and transceiver and/or an optical (for example, infrared) receiver and transceiver. For example, the communication unit 201 can include a wireless communication system supporting any one of a GSM network, an EDGE network, a CDMA network, a W-CDMA network, an LTE network, an OFDMA network, a Wi-Fi network, a WiMAX network, or/and a Bluetooth network. The wireless communication system according to an embodiment of the present disclosure is not limited to a wireless communication system supporting the aforementioned networks, and may be a wireless communication system supporting other networks. The communication unit 201 according to the present disclosure can transmit an image of the host device 100 captured by the image capture unit 203, and direction information of the client device 200 decided at the time of image capture, to the host device 100. In addition, the communication unit 201 can receive an image of the host device 100 captured by the target device, and direction information of the target device decided at the time of image capture, from the target device.

Further, the communication unit 201 can transmit determined distance information between the client device 200 and the host device 100, and direction information of the client device 200 decided at the time of image capture, from the image processing unit 205 to the host device 100. In addition, the communication unit 201 can receive determined distance information between the target device and the host device 100, and direction information of the target device decided at the time of image capture, from the target device.

Further, the communication unit 201 can transmit coordinate information of the target device determined in the image processing unit 205, to the host device 100. In addition, the communication unit 201 can receive coordinate information of the target device determined from the target device.

Further, the image capture unit 203 can detect UIDs of devices located within a constant distance every set period or in accordance to user control through a device capable of detecting a UID, and can determine if a corresponding device is a device registered to the host device 100 in accordance to whether a corresponding UID is the same as a previously stored UID. If the corresponding device is not the registered device, the image capture unit 203 can detect that a target device needing location registration exists, and recognize the corresponding UID as a UID of the target device. At this time, the image capture unit 203 can detect the UIDs of the devices using tag information, such as an RFID tag, an NFC tag, a QR code, a bar code, and the like.

The image capture unit 203 can photograph the target device or the host device 100 and acquire an image photographing the target device or the host device 100. At this time, assume that the client device 200 has an image capture device (for example, a camera and the like). The image capture unit 203 can photograph the host device 100 or the target device in accordance to control of the host device 100. For example, if a control signal for image capture is received from the host device 100, the image capture unit 203 can automatically perform the image capture for the host device 100 or the target device. For another example, if the control signal for the image capture is received from the host device 100, after the image capture unit 203 provides a user with information representing that the control signal for image capture is received from the host device 100, the image capture unit 203 can perform the image capture for the host device 100 or the target device in accordance to user control.

Based on an acquired image, the image processing unit 205 can determine a distance to a device included in the acquired image. For example, if the host device 100 is decided in the acquired image in accordance to user control, the image processing unit 205 can determine a distance from a location of a device taking the image to the host device 100. For example, if the host device 100 is selected and decided in the acquired image in accordance to user control, the image processing unit 205 can determine a distance between a location of the target device taking the acquired image and a location of the host device 100. For another example, if the target device is selected and decided in the acquired image in accordance to user control, the image processing unit 205 can determine a distance between a current location of the client device 200 taking the acquired image and a location of the target device. At this time, the image processing unit 205 can determine a distance between a location taking the image and a location of an object included in the image based on the related art.

Further, the image processing unit 205 can decide a coordinate of the host device 100 or the target device based on distance information between the client device 200 and the host device 100 or between the client device 200 and the target device determined in the image processing unit 205 and direction information of the client device 200 decided in the direction detecting unit 207.

At the time of image capture, the direction detecting unit 207 can decide the direction of the client device 200. In other words, at the time of image capture, the direction detecting unit 207 can decide the direction of the client device 200 based on a specific direction, using at least one sensor (for example, a gyroscope and the like) capable of detecting direction. For example, at the time of image capture, the direction detecting unit 207 can decide a direction in which the client device 200 is directing, based on a previously decided direction.

The UI management unit 209 includes at least one software constituent element providing a graphical user interface between a user and the client device 200. For example, the UI management unit 209 includes at least one software constituent element for displaying user interface information on a display device. The client device 200 can have the UI management unit 209 selectively. If the client device 200 has the UI management unit 209, the client device 200 can include a display device capable of displaying at least one graphic element. If an image is acquired by the image capture unit 203, the UI management unit 209 according to the present disclosure can display a UI for receiving a selection of the host device 100 or the target device within the acquired image in accordance to user control.

The aforementioned description has been made for an example in which the image capture unit 203, the image processing unit 205, the direction detecting unit 207, and the UI management unit 209 are provided, respectively, separately, but these devices can be constructed as one location decision module.

FIG. 3 is a block diagram illustrating a construction of a target device intending to decide a location in a zone-based service according to an embodiment of the present disclosure.

Referring to FIG. 3, a target device 300 includes a tag management unit 301. Here, the target device 300 can be an electronic device (for example, a TV, a refrigerator, a computer and the like) installed indoors.

The tag management unit 301 stores and manages UID information of the target device 300. The corresponding identification information can be used as information of a tag, such as an RFID tag, an NFC tag, a QR code, a bar code and the like.

The aforementioned description has been made for a basic construction of the target device 300 for description convenience's sake, but, in accordance to a design method, the target device 300 can additionally have a camera for image capture, a direction detecting unit for detecting the direction of the target device 300 at the time of image capture, and the like.

FIG. 4A is a flowchart illustrating a procedure of deciding a location of a target device based on an image photographing the target device in an electronic device according to an embodiment of the present disclosure.

Referring to FIG. 4A, in operation 401, a second electronic device can acquire an image photographing a first electronic device. At this time, the first electronic device can be the host device 100 or the target device 300, and the second electronic device having a device for image capture can be the host device 100, the client device 200, or the target device 300. For example, the host device 100 can acquire an image of the target device 300, by photographing the target device 300 using a camera provided in the host device 100. For another example, the target device 300 can acquire an image of the host device 100 by photographing the host device 100 using a camera provided in the target device 300. For further example, the client device 200 can acquire an image of the host device 100 or the target device 300 using a camera provided in the client device 200. At this time, the second electronic device can photograph the first electronic device in accordance to user control or control of the host device 100.

After that, the second electronic device proceeds to operation 403 and can decide a distance between the second electronic device and the first electronic device based on the acquired image. Using an algorithm capable of determining a distance from an image capture location to an object within the image, the second electronic device can decide a distance between a location of the first electronic device within the image and a location of the second electronic device taking the image.

Thereafter, the second electronic device proceeds to operation 405 and can decide a direction in which the second electronic device photographs the first electronic device. In other words, the second electronic device can decide a direction in which the second electronic device is directing the moment the second electronic device photographs the first electronic device. At this time, the direction of the second electronic device represents a direction in which the second electronic device is directing based on a set direction.

After that, the second electronic device proceeds to operation 407 and can decide a location of any one of the first electronic device and the second electronic device based on the decided distance and direction. For example, the second electronic device can decide a coordinate of the first electronic device or the second electronic device based on previously recognized one location information among the location of the first electronic device and the location of the second electronic device. For example, if the second electronic device recognizes location information of the first electronic device, the second electronic device can decide the location of the second electronic device based on the location information of the first electronic device. For another example, if the second electronic device recognizes location information of the second electronic device, the second electronic device can decide the location of the first electronic device based on the location information of the second electronic device.

Thereafter, in operation 409, the second electronic device can register the decided location of the first electronic device or the second electronic device. For example, the second electronic device can add and store decided location information in a previously stored internal structure diagram.

After that, the second electronic device can terminate the procedure according to the embodiment of the present disclosure.

FIG. 4B is a diagram illustrating a method for deciding a location of a target device based on an image photographing the target device in an electronic device according to an embodiment of the present disclosure.

Referring to FIG. 4B, the second electronic device includes a method 411 for acquiring an image photographing the first electronic device. At this time, assume that the second electronic device has a device (for example, a camera) capable of taking an image.

Further, the second electronic device includes a method 413 for deciding a distance between the second electronic device and the first electronic device based on the acquired image. At this time, assume that the second electronic device has a module capable of determining a distance between an object included in the image and a device taking the image.

Further, the second electronic device includes a method 415 for deciding a direction in which the second electronic device photographs the first electronic device. At this time, assume that the second electronic device has at least one sensor (for example, a gyroscope) capable of detecting the direction of the second electronic device.

Further, the second electronic device includes a method 417 for deciding a location of any one of the first electronic device and the second electronic device based on the decided distance and direction. For example, the second electronic device can include a method for deciding a coordinate of a photographed object based on distance information between an object taking an image and a photographed object, direction information of the object taking the image, and previously recognized location information of object.

Further, the second electronic device includes a method 419 for registering the decided location of the first electronic device or the second electronic device. At this time, the second electronic device stores an internal structure diagram representing location information in which at least one electronic device is located, and can include a method capable of updating the corresponding internal structure diagram.

FIG. 5 is a flowchart illustrating a procedure of photographing a place where a host device is installed and deciding a location of a target device in a client device according to an embodiment of the present disclosure.

Referring to FIG. 5, in operation 501, the client device 200 can acquire a UID of the target device 300. For example, the client device 200 can acquire the UID of the target device 300 every set period or in accordance to user control. At this time, the client device 200 can acquire the UID of the target device 300 through at least one tag among a QR code, a bar code, an RFID tag, and an NFC tag.

After that, in operation 503, the client device 200 determines if the target device 300 is a registered device. In other words, the client device 200 can determine if the target device 300 is a device registered to the client device 200, in accordance to whether the UID of the target device 300 acquired through the tagging is the same as a UID previously stored in the client device 200.

If the target device 300 is the device registered to the client device 200, the client device 200 terminates the procedure according to the embodiment of the present disclosure.

In contrast, if the target device 300 is not the device registered to the client device 200, the client device 200 recognizes that the target device 300 needing location decision is detected. In operation 505, the client device 200 can photograph a location where the host device 100 is installed, in a location of the target device 300. In other words, the client device 200 can photograph the host device 100 in a location where the target device 300 is installed, for the sake of distance measurement between the target device 300 and the host device 100.

FIG. 6 is a diagram illustrating locations of a host device and a target device installed indoors according to an embodiment of the present disclosure.

Referring to FIG. 6, the client device 200 can photograph a location 601 where the host device 100 is installed, in a location 603 where the target device 300 is installed. At this time, the client device 200 can display a user interface requesting a user to photograph the host device 100 in the location 603 of the target device 300.

After that, the client device 200 proceeds to operation 507 and can decide the location of the host device 100 in a captured image in accordance to user control.

FIG. 7 is a diagram illustrating an image photographing a place where a host device is installed in a location of a target device in an electronic device according to an embodiment of the present disclosure.

Referring to FIG. 7, if an image including a plurality of objects is captured, as illustrated in FIG. 7, the client device 200 can display the captured image on a display device, and decide as a host device an object 701 selected within the image including the plurality of objects in accordance to user control.

Thereafter, the client device 200 proceeds to operation 509 and analyze the captured image and decide a distance between the host device 100 and the target device 300. In other words, the client device 200 can determine the distance between the host device 100 within the acquired image and the client device 200 taking the image, using a module using the well-known distance determination algorithm.

After that, in operation 511, the client device 200 can decide a location of the target device 300 based on direction information of the client device 200 decided at the time of image capture, the decided distance information, and the location of the host device 100. In other words, the client device 200 can decide a coordinate of the target device 300 located indoors based on the direction information of the client device 200 decided the moment the client device 200 photographs the host device 100, the decided distance information, and the location of the host device 100. At this time, the client device 200 previously has knowledge of the designated location of the host device 100 and therefore, the client device 200 can decide the location of the target device 300 based on the designated location of the host device 100.

Thereafter, the client device 200 proceeds to operation 513 and can decide a zone of the target device 300 based on previously decided zone division information. For example, the client device 200 can determine whether the target device 300 is located in which zone among a plurality of previously stored zones based on the decided coordinate of the target device 300.

After that, the client device 200 proceeds to operation 515 and can display the target device 300 in the decided zone of the target device 300. In other words, the client device 200 can store the target device 300 of which the location is decided and location information of the target device 300 in a database of the client device 200, and display the location of the target device 300 in the decided zone within an indoor internal structure diagram. The client device 200 can transmit information about the location and zone of the target device 300 to the host device 100.

Thereafter, the client device 200 terminates the procedure according to the embodiment of the present disclosure.

The aforementioned description has been made in which the client device 200 previously acquires the location information of the host device 100 and directly decides the location and zone of the target device 300, but the client device 200 may transmit the distance information and direction information to the host device 100 and request the host device 100 to decide the location and zone of the target device 300.

FIG. 8 is a flowchart illustrating a procedure of, when there is no device of which the location is known, deciding a location of a target device in a client device according to an embodiment of the present disclosure.

Referring to FIG. 8, in operation 801, the client device 200 can acquire a UID of the target device 300. For example, the client device 200 can acquire the UID of the target device 300 every set period or in accordance to user control. At this time, the client device 200 can acquire the UID of the target device 300 through at least one tag among a QR code, a bar code, an RFID tag, and an NFC tag.

After that, in operation 803, the client device 200 determines if the target device 300 is a registered device. In other words, the client device 200 can determine if the target device 300 is a device registered to the client device 200, in accordance to whether the UID of the target device 300 acquired through the tagging is the same as a UID previously stored in the client device 200.

If the target device 300 is the device registered to the client device 200, the client device 200 terminates the procedure according to the embodiment of the present disclosure.

In contrast, if the target device 300 is not the device registered to the client device 200, the client device 200 recognizes that the target device 300 needing location decision is detected. In operation 805, the client device 200 can receive an input of a current location of the client device 200 from a user. For example, the client device 200 can display a previously stored indoor internal structure diagram, and receive from the user an input of a place where the client device 200 is currently located within the indoor internal structure diagram, and set the current location of the client device 200 by user control.

After that, in operation 807, the client device 200 can photograph a place where the target device 300 is installed, in the current location of the client device 200. For example, the client device 200 can photograph the place where the target device 300 is installed, in the current location of the client device 200 set by the user control.

FIG. 9 is a diagram illustrating locations of a host device and a target device installed indoors according to an embodiment of the present disclosure.

Referring to FIG. 9, the client device 200 can photograph a location 903 where the target device 300 is installed, in a current location 901 of the client device 200 set by user control. At this time, the client device 200 can perform capture by user control, or can automatically perform the capture when a control signal of the host device 100 is received.

Thereafter, the client device 200 proceeds to operation 809 and can decide a location of the target device 300 in a captured image in accordance to user control.

FIG. 10 is a diagram illustrating an image photographing in a current location a place where a target device is installed in a client device according to an embodiment of the present disclosure.

Referring to FIG. 10, if an image including a plurality of objects is captured, as illustrated in FIG. 10, the client device 200 can display the captured image on a display device, and decide as the target device 300 an object 1001 selected within the image including the plurality of objects.

Thereafter, the client device 200 proceeds to operation 811 and can analyze the captured image and decide a distance between the client device 200 and the target device 300. In other words, the client device 200 can determine the distance between the target device 300 within the acquired image and the client device 200 taking the image, using a module implementing distance determination algorithm. At this time, the client device 200 has knowledge of the current location of the client device 200 and therefore, the client device 200 can decide the location of the target device 300 based on the current location of the client device 200.

Thereafter, in operation 813, the client device 200 can decide the location of the target device 300 based on direction information of the client device 200 decided at the time of image capture, the decided distance information, and current location information of the client device 200. In other words, the client device 200 can decide a coordinate of the target device 300 located indoors based on the direction information of the client device 200 decided the moment the client device 200 photographs the target device 300, the decided distance information, and the current location of the client device 200. At this time, the client device 200 previously has knowledge of its own current location designated by a user and therefore, the client device 200 can decide the location of the target device 300 based on the current location of the client device 200.

The client device 200 proceeds to operation 815 and can decide a zone of the target device 300 based on previously decided zone division information. For example, the client device 200 can determine whether the target device 300 is located in which zone among a plurality of previously stored zones based on the decided coordinate of the target device 300.

Thereafter, the client device 200 proceeds to operation 817 and can display the target device 300 in the decided zone of the target device 300. In other words, the client device 200 can store the target device 300 of which the location is decided and location information of the target device 300 in a database of the client device 200, and display the location of the target device 300 in the decided zone within an indoor internal structure diagram.

The client device 200 then terminates the procedure according to the embodiment of the present disclosure.

FIG. 11A is a flowchart illustrating a procedure of deciding a location of a new target device when the new target device is detected in an electronic device according to an embodiment of the present disclosure.

Referring to FIG. 11A, in operation 1101, the electronic device can detect a new target device. At this time, the electronic device can be a host device 100 of which the location is designated. For example, the electronic device can gather UIDs of target devices located within a threshold range every set period or in accordance to user control. If a new UID not registered to the electronic device is detected among the gathered UIDs of the target devices, the electronic device can decide that the new target device is added.

After that, in operation 1103, the electronic device can request an image capture to a registered at least one client device. At this time, the client device can include a target device. For example, if a new target device is detected, the electronic device (i.e., the host device) can transmit an image capture request signal to a client device having a camera among all the client devices registered to the electronic device. At this time, if not recognizing which client device has a camera among the client devices registered to the electronic device, the electronic device may transmit the image capture request signal to all the client devices registered to the electronic device.

In operation 1105, the electronic device can receive a captured image from at least one client device. For example, the client devices receiving the image capture request signal from the electronic device can photograph the fronts in current locations of the client devices.

Thereafter, in operation 1107, the electronic device can compare a registered captured image and the currently received captured image from the at least one client device and decide a location of the new target device. At this time, assume that the electronic device stores images photographing the fronts in the locations of the respective client devices. In accordance to this, the electronic device can compare the previously stored captured image and the currently received captured image and decide whether the new target device has been added.

The electronic device can terminate the procedure according to the embodiment of the present disclosure.

FIG. 11B is a diagram illustrating a method for deciding a location of a new target device when the new target device is detected in an electronic device according to an embodiment of the present disclosure.

Referring to FIG. 11B, the electronic device can include a method 1111 for detecting a new target device. In an embodiment, the electronic device can include a tag reader or wired/wireless network for detecting other target devices.

Further, the electronic device can include a method 1113 for requesting an image capture to registered at least one client device and a method 1115 for receiving a captured image from the at least one client device. At this time, the client device can be home appliances, such as a refrigerator, a TV, a computer and the like, or can be a portable terminal, such as a smart phone, a tablet PC and the like.

Further, the electronic device can include a method 1117 for comparing a registered captured image and a currently received captured image from the at least one client device and deciding a location of a new target device. In an embodiment, the electronic device can include a storage device capable of storing a plurality of images. In addition, the electronic device can include a display device for displaying the decided location of the target device.

FIG. 12 is a flowchart illustrating a procedure of deciding a location of a target device in accordance to an image change or non-change in a host device according to an embodiment of the present disclosure.

Referring to FIG. 12, the host device 100 can acquire a UID of the target device 300 from a specific client device 200 in operation 1201. In other words, the specific client device 200 can acquire the UID of the target device 300 in accordance to user control, and transmit the acquired UID to the host device 100. In an embodiment, the specific client device 200 represents a portable terminal of which the location is not designated.

After that, in operation 1203, the host device 100 can determine if the target device 300 is a registered device. In other words, the host device 100 can determine that the target device 300 is the device registered to the host device 100, in accordance to whether the UID of the target device 300 acquired from the specific client device 200 is the same as a UID previously stored in the host device 100.

If the target device 300 is the device registered to the host device 100, the host device 100 terminates the procedure according to the embodiment of the present disclosure.

If the target device 300 is not the device registered to the host device 100, the host device 100 proceeds to operation 1205 and can request an image capture to a plurality of client devices 200 and target devices 300 of which the locations are designated. After that, the host device 100 can receive images from the plurality of client devices 200 and target devices 300 in operation 1207. For example, the host device 100 can transmit an image capture request signal to the client devices 200 and target devices 300 of which the locations are designated, and receive images photographing the fronts in locations of the respective client device 200 and target device 300 from the respective client devices 200 and target devices 300.

FIG. 13 is a diagram illustrating a location of a target device installed indoors according to an embodiment of the present disclosure.

Referring to FIG. 13, after the host device 100 requests image capture to a plurality of client devices and targets devices 1301, 1303, 1305, 1307, and 1309 of which the locations are designated, the host device 100 can receive images photographing the fronts in locations of the respective client devices and target devices 1301, 1303, 1305, 1307, and 1309 from the respective client devices and target devices 1301, 1303, 1305, 1307, and 1309.

In operation 1209, the host device 100 can compare previously stored images and the currently received images from the client device 200 and target device 300. In other words, the host device 100 can compare front images captured previously in the respective locations of the client device 200 and the target device 300 and the front images captured after reception of the image capture request.

Thereafter, in operation 1211, the host device 100 determines if there are the client device 200 and target device 300 whose images are changed.

If there are not the client device 200 and target device 300 whose images are changed, the host device 100 terminates the procedure according to the embodiment of the present disclosure.

In contrast, if there are the client device 200 and target device 300 whose images are changed, the host device 100 proceeds to operation 1213 and can determine an added graphic object within the changed image, and decide the graphic object as the target device 300. For example, the host device 100 can compare a previously captured and stored image and an image captured after reception of the image capture request. If an object not existing in the previously captured and stored image exists in the image captured after reception of the image capture request, the host device 100 can decide the corresponding object as the target device 300. For example, if a refrigerator not existing in the previously captured and stored image is added to the image captured after reception of the image capture request, the host device 100 can device the corresponding refrigerator as the target device 300. For another example, if a refrigerator exists in the previously captured and stored image but the refrigerator and a TV exist in the image captured after reception of the image capture request, the host device 100 can decide the TV added to the image captured after reception of the image capture request, as the target device 300.

In operation 1215, the host device 100 can determine a distance to the target device 300 within the image, based on a location of the client device 200 or target device 300 taking the changed image.

In operation 1217, the host device 100 can decide direction information of the client device 200 or target device 300. At this time, the host device 100 can decide the direction information of the client device 200 or target device 300, by receiving information about a direction which is detected at a time the client device 200 or target device 300 takes the image.

Thereafter, the host device 100 proceeds to operation 1219 and can decide location and/or zone information of the target device 300 based on the determined distance, the decided direction information, and location information of the corresponding client device 200 or target device 300. In other words, the host device 100 can decide a coordinate in which the added target device 300 is located based on the distance information, the decided direction information, and the location information of the device taking the image. Further, the host device 100 can decide whether the target device 300 is located in which zone among a plurality of previously stored zones based on the decided coordinate of the target device 300. For example, the host device 100 can decide a coordinate of an added refrigerator and decide whether the coordinate of the added refrigerator corresponds to which zone.

The host device 100 then proceeds to operation 1221 and can store the decided location and/or zone information of the target device 300. Further, the host device 100 can display the location information about the added target device 300.

After that, the host device 100 terminates the procedure according to the embodiment of the present disclosure.

FIG. 14 is a flowchart illustrating a procedure of displaying location information of an added target device in a client device or target device whose location is designated according to an embodiment of the present disclosure.

Referring to FIG. 14, the client device 200 or target device 300 of which the location is designated (hereinafter, referred to as a “location-designated device”) can acquire a UID of an added target device 300 in operation 1401. In operation 1403, the location-designated device can report the acquired UID of the added target device 300 to the host device 100. For example, the location-designated device can acquire the UID of the added target device 300 through tagging or wired/wireless network every set period or in accordance to user control, and can report the acquired UID of the added target device 300 to the host device 100.

After that, in operation 1405, the location-designated device can receive an image capture request from the host device 100. And, in operation 1407, the location-designated device can take an image. Here, assume that the location-designated device can be one or more, and has a device capable of taking the image.

In operation 1409, the location-designated device transmits the captured image to the host device 100. At this time, the location-designated device can transmit direction information of the location-designated device detected at the time of image capture, to the host device 100, together with the captured image.

Thereafter, in operation 1411, the location-designated device determines whether location information of the target device 300 is received from the host device 100.

If the location information of the target device 300 is not received from the host device 100, the location-designated device terminates the procedure according to the embodiment of the present disclosure.

In contrast, if the location information of the target device 300 is received from the host device 100, the location-designated device proceeds to operation 1413 and can display the location information of the target device 300. Here, assume that the location-designated device has a display device.

After that, the location-designated device terminates the procedure according to the embodiment of the present disclosure.

FIG. 15 is a flowchart illustrating a procedure of controlling an application corresponding to a target device newly registered to a specific zone in a host device according to an embodiment of the present disclosure.

Referring to FIG. 15, in operation 1501, the host device 100 determines whether a specific target device 300 has been registered to a specific zone. For example, the host device 100 can confirm a list of target devices 300 every set period or in accordance to user control, and determine whether a new target device 300 has been registered to the corresponding list.

In operation 1503, the host device 100 can confirm the type and feature of the corresponding zone. For example, the host device 100 can confirm a zone where the registered target device 300 is located among a previously stored zone list, and confirm the type and feature of the corresponding zone.

Thereafter, in operation 1505, the host device 100 can control the registered target device based on the type and feature of the corresponding zone and the kind of the registered target device 300. For example, the host device 100 can install or uninstall an application in accordance to the type and feature of the zone where the registered target device 300 is located and the kind of the registered target device 300, or can control a menu of the application in accordance to a situation. If the same target device 300 is located in a zone of a different type and feature, the host device 100 can install a different application in accordance to the zone of the target device 300. For example, if a refrigerator is newly registered to a first zone (e.g., a living room), the host device 100 can grasp a characteristic of the first zone and automatically install a weather forecast application in the refrigerator registered to the first zone. Further, the host device 100 can automatically install a remote controller application of a TV installed in the living room, in the refrigerator registered the first zone. In addition, the host device 100 can control a menu of the application installed in the refrigerator in accordance to user control, or can uninstall the application in accordance to need. For another example, if the refrigerator is newly registered to a second zone (e.g., a kitchen), the host device 100 can grasp a characteristic of the second zone, and automatically install a recipe application in the refrigerator registered to the second zone. At this time, the host device 100 can automatically install the recipe application related to an oven and a gas range, in the refrigerator registered to the second zone. For further example, if the TV is newly registered to a third zone (e.g., a children room), the host device 100 can grasp a characteristic of the third zone, and automatically install an application capable of monitoring the TV registered to the third zone, in a TV and/or client device (e.g., a parent's smart phone) installed in a fourth zone (e.g., a parent's room). For yet another example, if the TV is newly registered to the fourth zone (e.g., the parent's room), the host device 100 can grasp a characteristic of the fourth zone, and automatically install an application capable of playing classical music, in the TV registered to the fourth zone.

Various embodiments of the disclosure and all function operations described in the present specification can be implemented by computer software including a structure disclosed in the present specification and equivalent structures thereof, firmware, hardware or a combination of one or more of them. In addition, the embodiments of the disclosure described in the present specification can be implemented by one or more computer program products, i.e., data processing devices, or can be implemented by one or more modules of computer program instructions encoded on a computer-readable medium for controlling operations of these devices.

The computer-readable medium can be a machine-readable storage medium, a machine-readable storage substrate, a memory device, a construction of substance affecting a machine-readable radio wave stream, or a combination of one or more of them. The term of data processing device includes, for example, all data processing equipment, devices and machines including programmable processor, computer, or multiple processor or computer. The equipment can include a code added to hardware and creating an execution environment for a corresponding computer program, for example, a code constructing a processor firmware, a protocol stack, a database management system, an operating system, or a combination of one or more of them.

While the present disclosure has been shown and described with reference to various embodiments thereof, it will be understood by those skilled in the art that various changes in form and details may be made therein without departing from the spirit and scope of the present disclosure as defined by the appended claims and their equivalents.

The invention claimed is:

1. A method for determining a location of a target device of an electronic device, the method comprising:
- acquiring an image of the target device;
- determining a direction of the electronic device while acquiring the image;
- determining, based on the acquired image, a distance between the target device and the electronic device;
- transmitting, to a host device, information of the distance, the direction, and a location of the electronic device in an internal structure diagram; and
- receiving, from the host device, information of a location of the target device in the internal structure diagram,
- wherein the location of the target device is determined, by the host device, based on the distance, the direction of the electronic device and the location of the electronic device.

2. The method of claim 1, further comprising:
- acquiring an identifier of the target device by using at least one of a quick response (QR) code, a bar code, a radio frequency identification (RFID), or a near field communication (NFC) tag;
- determining, based on the identifier, whether the location of the target device is registered in the internal structure diagram; and
- in response to determining that the location of the target device is not registered in the internal structure diagram, acquiring the image comprising the target device.

3. The method of claim 2, further comprising:
- transmitting, to the host device, information for the identifier of the target device,
- wherein the determining of whether the location of the target device is registered in the internal structure diagram comprises receiving from the host device, a signal for requesting to acquire the image comprising the target device.

4. The method of claim 1, further comprising:
- displaying the location of the target device which is represented in the internal structure diagram.

5. The method of claim 1,
- wherein the acquiring of the image comprising the target device comprises:

capturing, by an image capturing device of the electronic device, an image comprising the target device, or receiving, from the target device, an image captured by the target device, and wherein the image captured by the target device comprises the electronic device.

6. The method of claim 1, further comprising:

determining a zone where the target device is located, based on the location of the target device, wherein the zone is predetermined within the internal structure diagram.

7. The method of claim 1, further comprising:

controlling the target device based on the location of the target device, wherein the controlling of the target device based on the location of the target device comprises:

confirming a type and feature of a zone where the target device is located, wherein the zone is predetermined in the internal structure diagram, and controlling the target device based on at least one of the confirmed type and feature of the zone and the kind of the target device, and wherein the controlling of the target device based on the location of the target device comprises:

installing or uninstalling an application in the target device, or controlling a menu of the application.

8. An electronic device for determining a location of a target device, the electronic device comprising:

an image capturing device configured to acquire an image of a target device;

at least one sensor for sensing a direction of the electronic device while acquiring the image;

at least one processor configured to determine, based on the acquired image, a distance between the target device and the electronic device; and a transceiver configured to:

transmit, to a host device, information of the distance, the direction, and a location of the electronic device in an internal structure diagram, and receive, from the host device, information of a location of the target device in the internal structure diagram, wherein the location of the target device is determined, by the host device, based on the distance, the direction of the electronic device, and the location of the electronic device.

9. The electronic device of claim 8, wherein the at least one processor is further configured to:

control the image capturing device to acquire an identifier of the target device by using at least one of a quick response (QR) code, a bar code, a radio frequency identification (RFID), or a near field communication (NFC) tag, determine, based on the identifier, whether the location of the target device is registered in the internal structure diagram, and in response to determining that the location of the target device is not registered in the internal structure diagram, control the image capturing device to acquire the image comprising the target device.

10. The electronic device of claim 9, wherein the transceiver is further configured to:

transmit, to the host device, information for the identifier of the target device, and receive from the host device, a signal for requesting to acquire the image comprising the target device.

11. The electronic device of claim 8, wherein the electronic device further comprises a display configured to display the location of the target device which is represented in the internal structure diagram.

12. The electronic device of claim 8, wherein the transceiver is further configured to receive, from the target device, an image captured by the target device, and wherein the image captured by the target device comprises the electronic device.

13. The electronic device of claim 8, wherein the at least one processor is further configured to determine a zone where the target device is located, based on the location of the target device, and wherein the zone is predetermined within the internal structure diagram.

14. The electronic device of claim 8, wherein the at least one processor is further configured to control the target device based on the location of the target device, wherein the controlling of the target device based on the location of the target device comprises:

confirming a type and feature of a zone where the target device is located, wherein the zone is predetermined within the internal structure diagram, and controlling the target device based on at least one of the confirmed type and feature of the zone and the kind of the target device, and wherein the controlling of the target device based on the location of the target device comprises:

installing or uninstalling an application in the target device, or controlling a menu of the application.

15. An electronic device for determining a location of a target device, the electronic device comprising:

a memory configured to store a location of the electronic device in an internal structure diagram;

an image capturing device configured to acquire an image comprising the target device;

at least one sensor for sensing a direction of the electronic device in relation to the target device, while acquiring the image; and at least one processor configured to:

determine, based on the acquired image, a distance between the target device and the electronic device, and determine a location of the target device in the internal structure diagram based on:

the distance between the target device and the electronic device, the direction in relation to the target device, and the location of the electronic device in the internal structure diagram.

* * * * *